Patented May 13, 1952

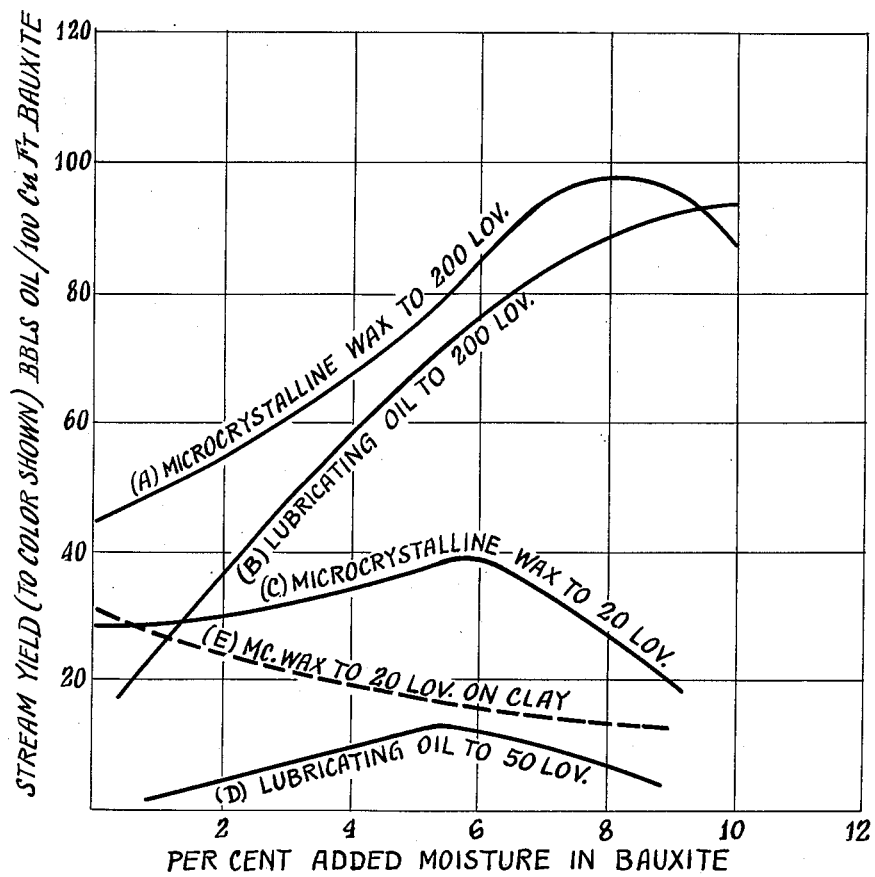

2,596,942

UNITED STATES PATENT OFFICE 2,596,942

FILTRATION OF OILS AND WAXES WITH BAUXITE

Donald W. Robertson, West Hempstead, and Charles F. Duchacek, Long Island City, N. Y., assignors to Socony-Vacuum Oil Company, Incorporated, a corporation of New York Application July 14, 1949, Serial No. 104,606

3 Claims. (Cl. 196—147)

This invention has to do with the treatment of oils and waxes to improve their color by filtration with an adsorbent earth, specifically bauxite.

It is conventional to improve the color of lubricating oils and waxes by subjecting them to treatment with filtering agents possessed of adsorptive power for selectively removing color bodies from the petroleum fraction treated. There are commonly used for such purposes a number of adsorptive materials such as fuller's earth of various grades, other natural clays, synthetic claylike materials, adsorptive carbon, various synthetic gels and the like, and various earthy materials, both in their natural form and in chemically treated forms. One material which may be so used is bauxite.

The methods which may be used for such treatment are various, although only two methods are common. In the older of these methods the oil (the term is used generically here to cover any petroleum derivative or fraction, and is generally so used throughout this specification except where specifically indicated otherwise), is percolated through a fixed bed of the adsorbent material. When the activity of the bed is spent, it is drained of oil, washed with naphtha, or other oil solvent, and steamed or otherwise freed of the solvent. The bed is then dumped, filled anew with active filter agent and returned to operation. The dumped spent filter agent is regenerated, usually by combustion to remove adsorbed impurities, and reused. In the other common method, known as "contact filtration," the adsorbent, usually in the form of a fine powder, is intimately admixed with the oil, usually with heating, and then separated from the oil. Adsorbent used in contact filtration is not customarily revivified. Petrolatums, waxes, etc., solid at normal temperatures, are treated as liquids, either at higher temperatures, or in solution in liquid hydrocarbons, or both.

The principal purpose of filtration is the improvement of color. This is done by removal of dark-colored materials, and also by the removal of materials which may be converted to dark-colored or "visible" color-bodies by the action of the adsorbent. The improvement of visual color is the most readily apparent effect, and the degree of improvement may be measured or estimated by any of several systems of measurement, one of the most common of which is the Lovibond color, as measured by matching a sample of the material against standard colored glass slides, and reported on a numbered scale, the lower members indicating lighter colors.

Bauxite is a naturally occurring material largely composed of alumina, and is used for various adsorbent purposes. For the treatment of oil by filtration, bauxite, as mined, is relatively worthless, having little color-removing efficiency. Consequently, to activate bauxite for use for oil filtration, it is customary to subject it to heat treatment, heating it to temperatures of the order of 600° to 1600° F. Exemplary of such treatment of bauxite is U. S. Patent 2,390,197, to F. W. Breth and A. Kinsel, who select a bauxite, containing, in the raw state, water of constitution to the extent of 20% or more, and heat it to a temperature of from 500° to 1600° F. (1000° F. to 1200° F. preferred) under specified conditions, and regenerate by roasting "at elevated temperature, and preferably between 600° and 1600° F."

Now it is known that exposure to such temperatures greatly decreases the water content of the bauxite. Reference is made to "Bauxite as a Drying Adsorbent," by LaLande, McCarter and Sanborn, Industrial and Engineering Chemistry, February, 1944, which discusses the effect of heat treatment of bauxite, and at page 103 makes the following statement: "The data * * * show that only a small portion of the combined water was eliminated from Arkansas I bauxite below 500° F. Between 500° F. and 600° F. dehydration was enormously accelerated, and altogether about 70% of the water of constitution was expelled (this decrease and the following losses are based on the initial water content). An arrest began somewhat below 600° F. and continued to about 850° F.; in this interval only 7% of water was lost. After a final period of accelerated loss between 850° and 1000° F. (15% decrease), the dehydration progressed slowly toward completion as the temperature was raised from 1000° F. to 1600° F. (8% loss). The other bauxites reacted similarly * * *." Thus we see that Breth et al. were working with a bauxite from which most or even all of the water of constitution had been removed, as had been the prior art to which they refer.

This is in line with the findings of Chowdhury and Das, "Decolourization of Oils with Mixed Adsorbents" Journal of Indian Chemical Society, 1930, pages 395, 396, who show the decolorizing power of bauxite to be increased by heating to drive off water, reporting data on water content corresponding fairly with LaLande.

This removal of water from bauxite is quite in line with the practise for adsorbent earths generally, as may be noted from "A Method of Evaluating Bleaching Clays" by Donald Ross, U. S. Bureau of Mines publication R. I. 4295, of June, 1948, page 4, "in the current work on adsorptive clays, for each increment of water removed, a corresponding increase in decolorizing capacity took place" and "for decolorizing purposes, therefore, the problem is one of drying the clays at an optimum temperature for an optimum time, assuming that the clays had reached equal water content." At page 7, reference is made to "bauxite type material in dehydrated form. It is highly rated because of decolorizing capacity and ability to stand oft-repeated regeneration by heat."

Contrary to this entire line of knowledge, teaching, and custom, we have found that the color removal efficiency of bauxite may be effectively enhanced by controlled addition of moisture thereto.

The gist of this invention, therefor, is the decolorization of oils by use of bauxite having a controlled amount of moisture greater than the residual amount remaining after calcination to temperatures of the range ordinarily used.

To explain what is meant, reference is again made to the LaLande et al. article above quoted. Reference to this article shows that removal of water of constitution is relatively rapid up to about 600° F. and relatively slow from there to about 850° F. For the purposes of this specification, solely to simplify language, we will refer to bauxite which has been heated to 750° F. and held there for a period of two hours as "dry" bauxite. By reference to Table VI of LaLande, et al., it will be seen that such bauxite probably contains about 6% of water of constitution, which can be reduced to about 2% by heating to 1000° F. and to 0% by heating to 1600° F. Lacking direct confirmation of these figures, we hesitate to use them as a numerical basis for statement of our disclosure.

Our invention is based upon the discovery that by taking the "dry" bauxite as above defined, and adding thereto controlled amounts of moisture, as by subjecting the clay to atmosphere of controlled humidity for controlled periods, we can definitely increase the decolorizing efficiency of the bauxite.

Filtration operations under such conditions are summarized in the drawing attached to and made a part of this specification.

In the drawing there are set forth in a single figure, in curve form, the results of filtration of two typical stocks, to two levels of color removal, over bauxite containing controlled amounts of added moisture, and, for comparison, a filtration of one of the stocks over clay of controlled moisture content.

Prior to the discussion of results of filtration, the bauxite filtration medium or adsorbent used in the tests will be discussed. A commercially available activated bauxite was utilized, having a bulk density of approximately 55 pounds per cubic foot and a "moisture and volatile" content, determined by ignition to 1600° F., of not over about 6.5% by weight. A typical analysis (volatile-free basis) of commercial material so supplied is:

| | Percent |
|---|---|
| $SiO_2$ | 10.0 |
| $Al_2O_3$ | 78.8 |
| $Fe_2O_3$ | 7.0 |
| $TiO_2$ | 4.2 |
| | 100.0 |

Such materials are usually prepared from commercial bauxite, as mined, by heating to a controlled extent to remove moisture. Typical analyses of commercial bauxite, as mined, are set forth in LaLande et al., "Bauxite as a Drying Adsorbent," Ind. and Eng. Chem. 36, page 100 (1944), above referred to, and a single typical analysis therefrom is set forth below.

TABLE I

*Chemical analyses*

| | |
|---|---|
| Bauxite | Arkansas I |
| Appearance | Light brown-gray partially oolitic |
| Bulk density[1], lbs./cu. ft | 70.3 |
| Analysis: | |
| Ignition, loss, percent[2] | 28.76 |
| $Al_2O_3$, percent | 55.81 |
| $SiO_2$, percent | 10.08 |
| $Fe_2O_3$, percent | 2.72 |
| $TiO_2$, percent | 2.63 |

[1] After activation the bulk density of the Arkansas and Guiana ores was 55–57 lb./cu. ft.; that of the French bauxite, 81 lb.
[2] After heating to constant weight at 220° F.

TABLE II

*Calculated mineralogical composition*
*(In percent)*

| | Arkansas I |
|---|---|
| Bauxite | |
| Kaolinite, $Al_2O_3.2SiO_2.2H_2O$ | 21.7 |
| Gibbsite, $Al(OH)_3$ | 72.3 |
| Bohmite, $AlO.OH$ | |
| Anatase, $TiO_2$ | 2.6 |
| Hematite, $Fe_2O_3$ | 2.7 |
| Total | 99.3 |
| $H_2O$ (ignition loss) | 28.75 |
| $H_2O$ (calculated) | 28.00 |

As will be noted by comparison with the data on dehydration of bauxite from the LaLande article, the purchased commercial material corresponded to that which has been previously defined herein as a "dry" bauxite, viz, one which has been heated to 750° F. and held there for a period of two hours. In terms of the procedure of the LaLande article, it is a bauxite which has been heated beyond the threshold of the "600° F. to 850° F." "arrest," and held there long enough for attainment of equilibrium. In experimentation, this commercial bauxite was again heated to 750° F. and held there for two hours. Then selected portions were exposed to atmospheres of controlled humidity until the desired amounts of moisture were picked up. In the laboratory, this may be done by exposure over salt solutions, in known manner. In commercial practice, it may be done readily by exposing the bauxite, if new, to tempering heating at 750°–850° F. and then to an air stream of controlled humidity (as by mixing in steam), for a sufficient time to bring about desired humidification, as determined by weight increase. Obviously a bauxite which has been spent in filtration and regenerated by burning may have its moisture content restored in a similar manner.

In the illustrative examples, such material, of 30–60 mesh size, and of controlled moisture content, as indicated, was placed in percolation tubes, through which the oil was passed, the diameter of the percolation tube, the depth of bed, the rate of oil charge, and the temperature of filtration being as indicated for the several examples. In each case, the efficiency of filtration is expressed as "stream yield" i. e., barrels of oil (42 gallons), of finished color produced per 100 cubic feet of filter medium.

The oils which were treated exhibited, for the raw charge stocks, the following properties.

|  | Microcrystalline Wax | Lubricating Oil |
|---|---|---|
| Gravity, °API | | 26.6 |
| Viscosity SUV at 210°F | 70 | 106 |
| Flash, C. O. C., °F | 460 | 480 |
| Color, Lovibond | 750 | 250 |
| Melting Point, ASTM, °F | 159.0 | |

EXAMPLE I

*Microcrystalline wax*

Filter bed _____ 4" diameter 6" deep
Temperature _____ 190° F.
Rate _____ 0.6 bbls./ton/hour
Initial color charge stock _ 750 Lovibond
Final color filtered stock _ 200 Lovibond
Yield data: As shown in drawing, curve "A"

NOTE: This stock showed a stream yield increasing gradually until, at 8% added moisture, it amounted to about twice that obtained with "dry" bauxite.

EXAMPLE II

*Lubricating oil*

Filter bed _____ 2" diameter 15" deep
Temperature _____ 125° F.
Rate _____ 0.16 bbl./ton/hour
Initial color charge stock . 250 Lovibond
Final color filtered stock _ 200 Lovibond
Yield Data: As shown in drawing, curve "B"

NOTE: This stock showed a stream yield increasing with moisture content until, at 10% added moisture, it amounted to about six times that obtained with "dry" bauxite.

EXAMPLE III

*Microcrystalline wax*

Filter bed _____ 4" diameter 6" deep
Temperature _____ 190° F.
Rate _____ 0.6 bbls./ton/hour
Initial color charge stock _ 750 Lovibond
Final color filtered stock __ 20 Lovibond
Yield Data: As shown in drawing, curve "C"

NOTE: This stock showed a stream yield which at 6% added moisture was about 40% greater than with "dry" bauxite.

EXAMPLE IV

*Lubricating oil*

Filter bed _____ 2" diameter 15" deep
Temperature _____ 125° F.
Rate _____ 0.16 bbls./ton/hour
Initial color charge stock . 250 Lovibond
Final color filtered stock _ 50 Lovibond
Yield Data: As shown in drawing, curve "D"

NOTE: This stock showed stream yields reaching a peak at between 5% and 6% added moisture which was about 13 bbls./cu. ft., whereas with "dry" bauxite, essentially no oil was gotten in this high color reduction operation.

EXAMPLE V

*Microcrystalline wax*

Filter material _____ Clay
Filter bed _____ 2" diameter 6" deep
Temperature _____ 190° F.
Rate _____ 0.6 bbls./ton/hour
Initial color charge stock . 750 Lovibond
Final color filtered stock _ 20 Lovibond
Yield Data: As shown in drawing, curve "E"

NOTE: This operation shows the usual decrease in efficiency with increasing moisture experienced with ordinary filter clay, and may be compared with curve D, for bauxite with controlled moisture. The clay for this example was heated to 750° F. for two hours and then had moisture added, as described for bauxite.

It will be noted from the drawing that substantial increase in yield of oil filtered to a given color per unit of bauxite was gotten by controlled addition of moisture. It will also be noted that these increases pass through a maximum dependent upon the degree of color reduction carried out in the filtration operation. For large reductions of color (curves C and D) the maximum increase, or optimum moisture content, is around 5%. For lesser reductions in color (curves A and B), the optimum moisture content is around 8 to 12%. These figures will of course vary with the stocks being filtered, as is evident from the curves. Since any increase in moisture gives some improvement in stream yield over the "dry" bauxite, the effective lower limit becomes one based on economic considerations, as does the ultimate upper limit upon the descending side of the curve. In general, the benefits of this invention tend to become effective at added moisture contents of 2%. Similarly, economic conditions dictate an effective upper limit of about 12% of added moisture. Very substantial benefits may be obtained at added moisture contents ranging from about 4% to about 12% this being the region through which the optima of the curves run. When so claimed, it will be understood, of course, that added moisture contents within the lower portion of the range are applicable for large reductions in color, and similarly, added moisture contents in the higher portion of the range are applicable for lesser reductions in color, all as taught herein.

It is not known what condition the added water assumes, although it is reasonable to suppose that it becomes water of constitution of at least a portion of the bauxite. It is known that attempts to dehydrate mined bauxite directly to a water content corresponding to that obtained by heating to 750° F. and then rehydrating, as described, have not resulted in increased filtration efficiency.

We claim:

1. That method of reducing the color of petroleum stocks such as oils and waxes by filtration with bauxite in a state of hydration obtained by heating the bauxite to a temperature of the order of 750° F. for a period of two hours and then adding thereto at least about 2% by weight of water, based upon the heated bauxite weight.

2. That method of reducing the color of petroleum stocks such as oils and waxes by filtration with bauxite in a state of hydration obtained by heating the bauxite to a temperature of the order of 750° F. for a period of two hours and then adding thereto from about 2% to about 12% by weight of water, based upon the heated bauxite weight.

3. That method of reducing the color of petroleum stocks such as oils and waxes by filtration with bauxite in a state of hydration obtained by heating the bauxite to a temperature of the order of 750° F. for a period of two hours and then adding thereto from about 4% to about 12% by weight of water, based upon the heated bauxite weight.

DONALD W. ROBERTSON.
CHARLES F. DUCHACEK.

REFERENCES CITED

The following references are of record in the file of this patent:

UNITED STATES PATENTS

| Number | Name | Date |
|---|---|---|
| 2,348,780 | Blaker et al. | May 16, 1944 |
| 2,378,155 | Newsome et al. | June 12, 1945 |
| 2,446,799 | Winding | Aug. 10, 1948 |